(12) United States Patent
Palum

(10) Patent No.: US 6,326,998 B1
(45) Date of Patent: Dec. 4, 2001

(54) OPTICAL BLUR FILTER HAVING A FOUR-FEATURE PATTERN

(75) Inventor: Russell J. Palum, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 08/947,240

(22) Filed: Oct. 8, 1997

(51) Int. Cl.[7] .................................................. H04N 5/225
(52) U.S. Cl. ........................... 348/342; 348/360; 348/340
(58) Field of Search ..................................... 348/340, 342, 348/345, 354, 360, 362, 335, 276, 290, 347; 359/559, 563, 564, 574, 558

(56) References Cited

U.S. PATENT DOCUMENTS

| | | | |
|---|---|---|---|
| 3,821,795 | 6/1974 | Okano | 358/47 |
| 4,101,929 | 7/1978 | Ohneda et al. | 358/44 |
| 4,178,611 | 12/1979 | Okano | 358/44 |
| 4,421,398 * | 12/1983 | Suzuki et al. | 396/150 |
| 4,477,148 | 10/1984 | Tsuji et al. | 350/286 |
| 4,878,737 * | 11/1989 | Ise | 348/342 |
| 4,989,959 * | 2/1991 | Plummer | 438/258 |
| 4,998,800 | 3/1991 | Nishida et al. | 350/162.2 |
| 5,322,998 * | 6/1994 | Jackson | 250/216 |
| 5,438,366 | 8/1995 | Jackson et al. | 438/342 |
| 5,568,197 * | 10/1996 | Hamano | 348/342 |
| 5,589,882 * | 12/1996 | Shiraishi et al. | 348/340 |
| 5,684,293 * | 11/1997 | Kessler | 348/342 |
| 5,745,175 * | 4/1998 | Anderson | 348/345 |
| 6,040,857 * | 3/2000 | Hirsh et al. | 348/241 |
| 6,091,451 * | 7/2000 | Farr et al. | 348/342 |
| 6,111,608 * | 8/2000 | Koizumi et al. | 348/342 |

FOREIGN PATENT DOCUMENTS 4-67009   3/1992 (JP) .................................. G02B/27/46

* cited by examiner

Primary Examiner—Andrew B. Christensen
Assistant Examiner—Jacqueline Wilson
(74) Attorney, Agent, or Firm—David M. Woods

(57) ABSTRACT

In order to limit the maximum spatial frequency of image light falling upon the array of photosites in an image sensor, an imaging apparatus includes an optical section through which the image light passes and an optical filter including an array of four shaped features placed in mutually spaced relation in the optical section in order to blur the image light and limit the spatial frequencies to values below the Nyquist frequency of the sensor. The optical filter is placed to best effect in the stop of the optical system.

9 Claims, 4 Drawing Sheets

OPTICAL BLUR FILTER HAVING A FOUR-FEATURE PATTERN

FIELD OF THE INVENTION

The invention relates generally to the field of electronic imaging, and in particular to an optical low pass filter used in the optical path of an electronic imaging system to reduce aliasing, or undersampling, effects.

BACKGROUND OF THE INVENTION

An electronic imaging system typically produces a signal output corresponding to a viewed object by spatially sampling an image of the object in a regular pattern with a fixed, regular array of photosensitive picture elements, such as, for example, with a charge-coupled device (CCD) solid-state image sensor, a charge injection device, or a vidicon. In such imaging systems, it is well-known that detail components in the object which contain frequencies too high to be analyzed within the sampling interval of the sensor contribute to the amplitudes of lower frequency components, and thereby produce imaging errors commonly referred to as aliasing or undersampling artifacts. In particular, if spatial detail being imaged contains a high frequency component of a periodicity smaller than the pitch (periodicity) of each neighboring photosensitive picture element of the solid state image sensor, the subsequent detection of this high frequency component tends to result in a spurious signal due to aliasing. Such aliasing artifacts severely reduce the quality of video or still images.

The pitch (periodicity) of the elements in a photosensitive picture element array is the center-to-center distance of the elements in the array. The sampling frequency of the sensor is 1/(sensor pitch) and the Nyquist frequency of the sensor is ½ the sampling frequency. It is well known in the prior art that if the spatial frequency content of the scene image that falls on the sensor exceeds the Nyquist frequency for the sensor, aliasing will result. The high frequency information will appear to be low frequency image data in the sampled image. Color cameras, particularly single sensor cameras, have a color filter array that includes several different colors, thereby reducing the sensor sampling frequency for each color and making the sensor more susceptible to aliasing. Moreover, the sampling frequency and the Nyquist frequency may not be equally related for all colors because the color filter array may not have equal numbers of pixels in each color plane, which leads to colored aliasing artifacts in response to neutral high frequency image content. This effect substantially reduces image quality.

There are many well-known methods for reducing aliasing from a two-dimensional array of photosites. These all involve optically limiting the scene image frequency content to spatial frequencies below the Nyquist frequency by blurring the image in several dimensions in a controlled manner. In general, an electronic imaging system can minimize aliasing if its optical section has a frequency response that cuts off, or filters out, the higher frequency content of the object. As a result, the optical section generally employs an optical low pass filter to substantially reduce the high frequency component contained in the spatial detail of the image received by the image sensor. It is thus well-known in the prior art that the design of electronic imaging systems involves a trade-off between image sharpness and the susceptibility of the imaging system to aliasing distortions or undersampling artifacts.

The electronic imaging systems employed in digital cameras typically have an optical blur filter, also known as an anti-aliasing filter, over the sensor to provide the low pass filtering and to prevent aliasing in the image. These filters are typically made of quartz crystal and take advantage of the birefringent properties of quartz. A single layer of quartz will produce two image points in the image for a single point in the object. Since digital cameras have a two-dimensional CCD array, an optical low pass filter that produces two image points in each direction for a given object point is preferred. A common type of such filter consists of several layers of quartz that produce a four-spot square pattern. This pattern suppresses aliasing more on the diagonal orientation than on the x- and y-axis but the x and y suppression is equal, and the suppression on the diagonals is also equal.

A typical birefringent blur filter uses three plates of quartz aligned, for example, to convert a single image point spread function to a square pattern of four point spread functions arrayed at the four corners of the square. A typical example of such a filter is described in Japanese patent application No. 52-66449. Other methods use diffraction to increase the size of the point spread function, e.g., see U.S. Pat. No. 4,178,611, which describes a two-dimensional grating having a triangular wave cross-sectional configuration with respect to two directions. In U.S. Pat. No. 4,878,737, two periodic structures are provided on a surface of a transparent substrate so as to form a regularly arranged pattern of projections, each in the form of a frustrum of a pyramid.

It is also known that a single polygonal prism placed in the aperture of an optical system acts as an optical low-pass filter (e.g., see U.S. Pat. No. 3,821,795). For example, a weak pyramid can be used as taught by U.S. Pat. No. 4,989,959 and a weak axicon can be used as taught by U.S. Pat. No. 5,322,998. (An axicon is herein taken to mean a conical shape, or a substantially conical shape, such as a truncated cone.) Both the weak pyramid and the weak axicon operate similarly, the pyramid producing four spots from a single point at certain focal distances and the axicon producing a ring at certain focal distances. ("Weak" as used herein refers to pyramid or axicon angles of generally less than five minutes of arc.) The ring reduces the image modulation to zero at spatial frequencies of 1/(diameter of the ring) and the pyramid reduces the image modulation to zero at spatial frequencies of 1/(spot spacing).

The pyramid and axicon filters work best if they are placed at the system stop or at an image of the stop if a real image is accessible. Retrofocus lens designs are very common in video camera designs because they have sufficient backfocus to clear the cover glass of the CCD sensor. The pyramid and axicon filters do not work well when placed in front of a retrofocus lens since the ray bundles for most off axis points pass through only one side of the axicon or one facet of the pyramid. For small angles off axis, the amount of blur will thus be field dependent and there will be almost no blur at all for bundles that pass through only one side of the axicon or one facet of the pyramid.

Furthermore, the pyramid and axicon filters only work well for flat objects where the system focus can be controlled. The objective is to maintain the blur effect at all focal lengths, and the problem with a single polyhedral or conical prism is that the blur effect is eliminated if the user refocuses the optical system incorporating the blur filter. Consequently, the effects of both filter types can be mitigated almost completely by adjusting the system focus. Furthermore, if the object is not flat, then one plane will be at the focal distance that has the desired point spread function and other planes will have smaller and larger point spread functions.

The axicon filter adds a weak conical aberration to the pupil wavefront in a well corrected lens design, and the pyramid filter adds a weak pyramidal aberration. Defocus adds a spherical shape to the pupil wavefront. A weak sphere can be subtracted from the axicon or pyramid wavefront by refocusing the system. The resulting aberration will be almost too small to notice and composed mostly of spherical aberration. The angle of the axicon or the face angles of the prism are typically small. They are chosen so that the separation of the point spread function is on the order of the pitch of the photosite array if zero modulation at the Nyquist frequency is desired. If a different zero is desired, the separation can be chosen for this spatial frequency.

The aberration added by the blur filter is very small and the size of the point spread function is not very much larger than the unaberrated point spread function at the focal plane with the smallest rms point spread function. It is possible to increase the axicon or pyramid angle until the point spread function minimum size is large enough to reduce modulation of high frequency content of the image. The dominant aberration is spherical which produces a point spread function with a bright center and a large skirt. The skirt reduces the modulation at low frequencies and the bright center maintains modulation at high frequency. This is clearly not the optimum filter. Ideally the cutoff should be sharp at the Nyquist frequency without a reduction in the modulation at low spatial frequencies. What is needed is an optical blur filter that maintains the blur effect despite refocusing without reducing modulation at low spatial frequencies.

SUMMARY OF THE INVENTION

The present invention is directed to overcoming one or more of the problems set forth above. Briefly summarized, according to one aspect of the present invention, in order to limit the maximum spatial frequency of image light falling upon the array of photosites in an image sensor, an imaging apparatus includes an optical section through which the image light passes and an optical filter including an array of four shaped features placed in mutually spaced relation in the optical section such that all incoming rays leading to an image point on the image sensor pass through the four features. The shaped features blur the image light and limit the spatial frequencies to values below the Nyquist frequency of the sensor. The optical filter is placed to best effect in the stop of the optical system.

The advantage of the invention is that the optical blur filter maintains the blur effect despite refocusing without reducing modulation at low spatial frequencies.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art.

Figure 1:
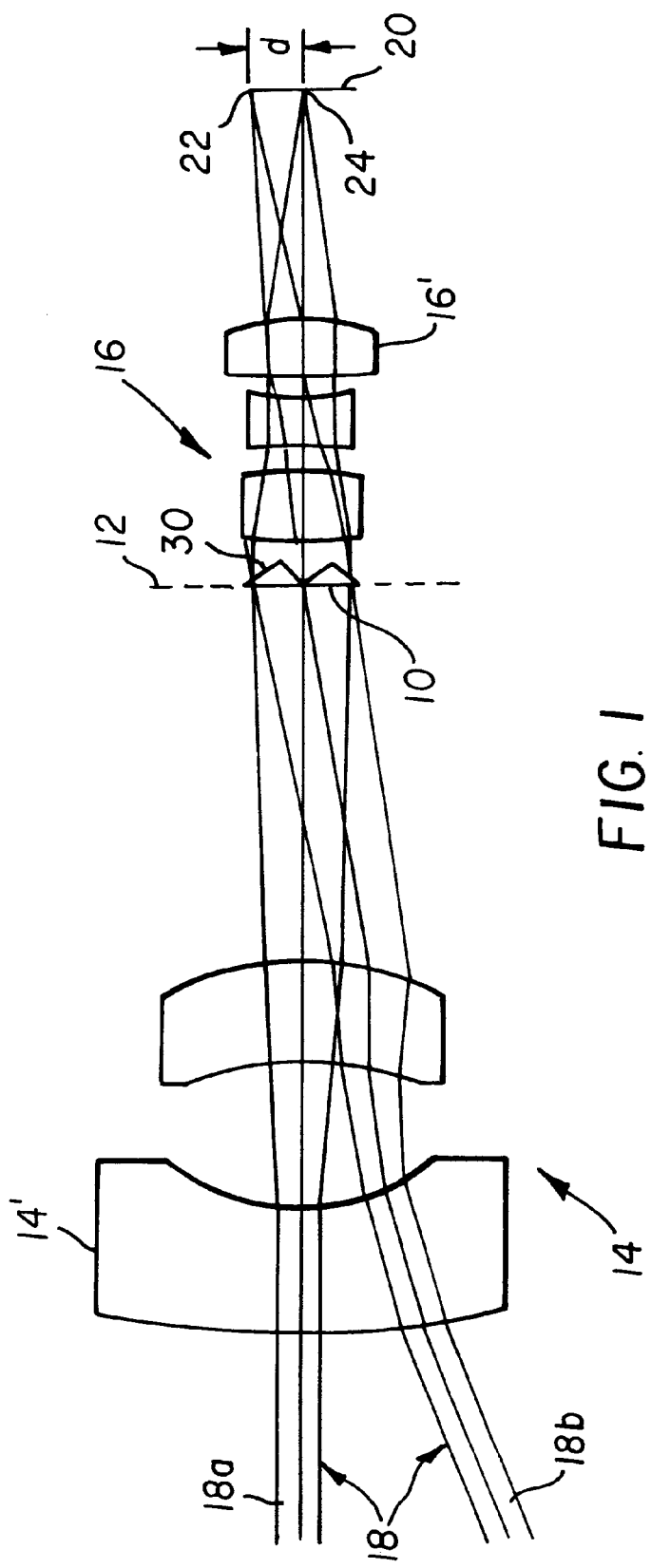
FIG. 1 is a diagram of an optical system including an optical blur filter according to the invention.
Figure 10:
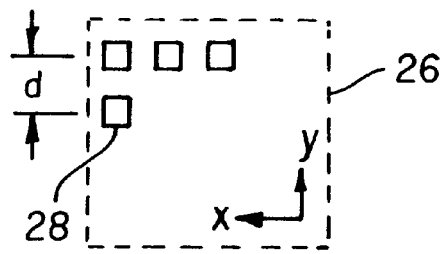
FIG. 10 is a diagram of an image sensor useful in the optical system shown in FIG. 1.

Referring first to FIG. 1, an embodiment of the present invention includes an optical system comprising an optical blur filter 10 located in a stop region 12 between a first optical section 14 and a second optical section 16. The two optical sections 14, 16 focus incoming rays 18 upon an image plane 20, where the distance d between image points 22, 24 defines the spatial extent of the blur pattern. Typically, referring to FIG. 10, a charge coupled device (CCD) sensor 26 would be positioned in the image plane 20, and the distance d would correspond to the pitch between the photosensitive pixels 28 composing the sensor 26. The blur filter 10 would preferably provide blurring in two dimensions x,y as seen relative to the sensor 26. Moreover, the blur filter 10 will provide the desired low pass effect even though the distance d is different from the pixel pitch. Though the optical sections 14, 16 are shown as compound lenses, this should not be construed as a limitation and the optical sections 14, 16 could comprise single lenses or compound structures other than as shown in FIG. 1. Moreover, although the stop region 12 is preferred, the blur filter 10 may be located at other locations in the optical system.

Figure 2:
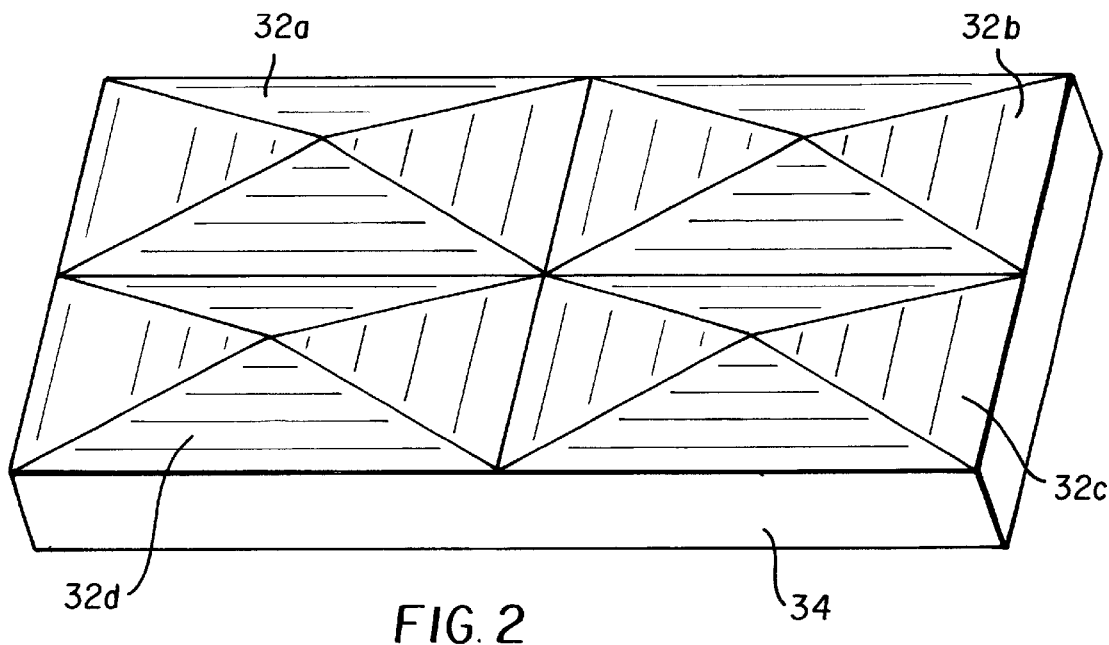
FIG. 2 is a perspective view of the embodiment of the optical blur filter shown in FIG. 1 incorporating four pyramidal features.
Figure 3:
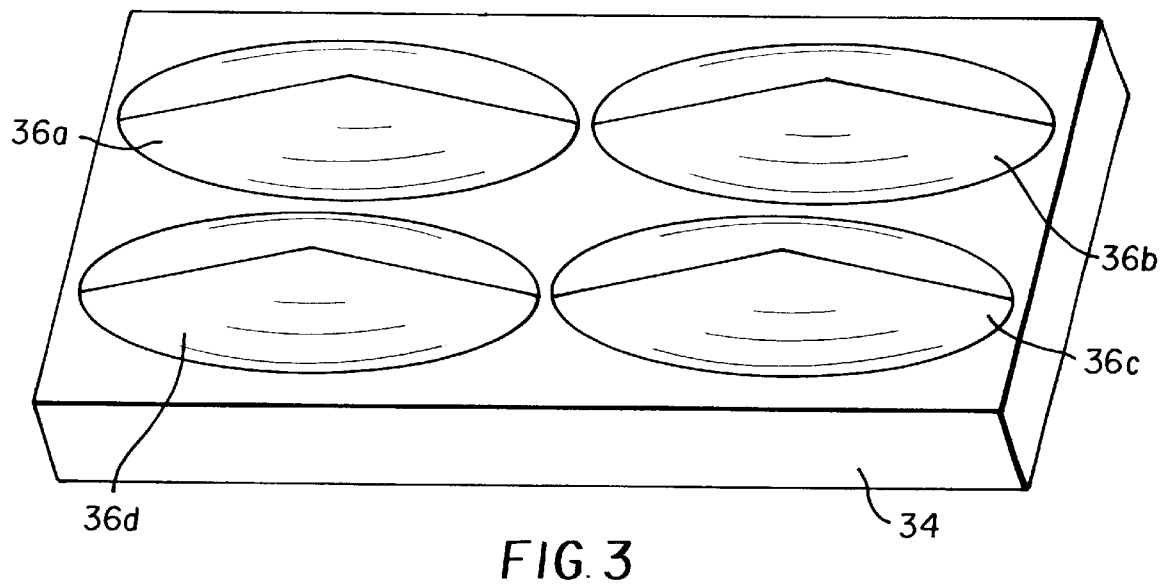
FIG. 3 is a perspective view of a second embodiment of the optical blur filter shown in FIG. 1 incorporating four axicon features.

The blur filter 10 is, according to the invention shown in FIG. 1, a four-featured pattern of optically transparent three-dimensional features 30. Referring to FIG. 2, the blur filter 10 may be an arrangement of four pyramidal features 32a,b,c,d arranged on the four quadrants of a substrate 34, or it may alternatively be an arrangement of four axicon features 36a,b,c,d as shown in FIG. 3. (An axicon is herein defined as a conical shape or a substantially conical shape, or a solid section of a conical shape, such as a truncated cone; the pyramidal shape is herein defined to include a substantially pyramidal shape, or a solid section of a pyramidal shape, such as a truncated pyramid.) To prevent correction by focusing, at least four features, in a 2 by 2 array or other configuration, should be included in the bundle of rays that leads to any signal point in the field of the imaging system. For example, if the blur filter 10 is located at other than the stop region 12, the four features 30 need to be located within each bundle of rays that leads to a given point in the image plane. For instance, each bundle 18a and 18b would have to see four features in order to generate the spots 22 and 24 shown in FIG. 1.

Figure 4:
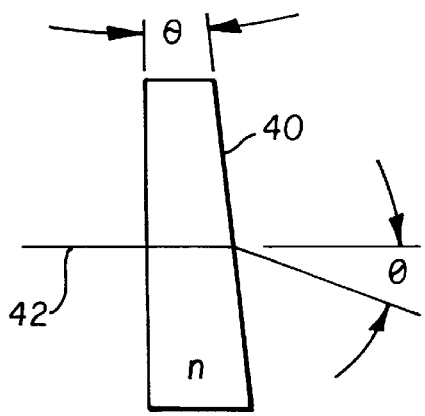
FIG. 4 is a diagram showing the effect of a single facet on an incident ray of light.

The effect of an axicon or pyramid blur filter can be explained, as shown in FIG. 4, by first looking at the effect on an incident light ray of a single facet 40 on one side of a single feature of the filter. This facet 40 bends an incident ray 42 by an angle φ. The equation for the bending as a function of prism angle is $$\phi = (n-1)\theta$$

for $$n \approx 1.5$$

$$\phi = 0.5\theta$$

where n is the index of refraction and θ is the prism apex angle. This equation is for a thin prism with a small angle. For a plastic prism with an index n of about 1.5 the ray 42 will be bent through about one-half the prism apex angle (θ).

Figure 5:
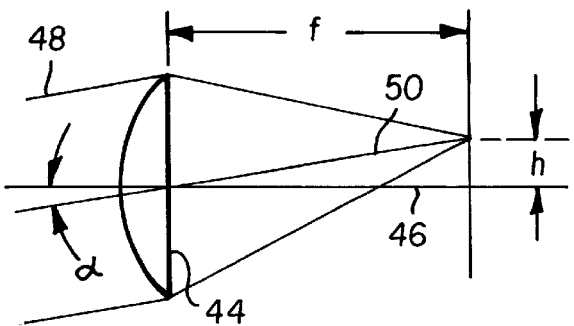
FIG. 5 is a diagram showing the effect of a lens upon the height of the image point.

As shown in FIG. 5, the location of the image of a distant point object formed by a lens 44 is a function of an angle α which the object subtends on an optical axis 46. All of the rays 48 from the object point will be at this angle and they will be parallel to each other. The ray 50 that passes through the center of the lens 44 is not bent so the height h of the image point above the axis can be located with this ray, as follows $$h = f^* \tan(\alpha)$$

for small angles $$\tan(\alpha) = \alpha \text{ in radians}$$

$$h = f^* \alpha$$

The image will be formed one focal length f from the lens principle plane so the height h of the image point above the axis is f*α where f is the focal length and α is the angle in radians.

Figure 6:
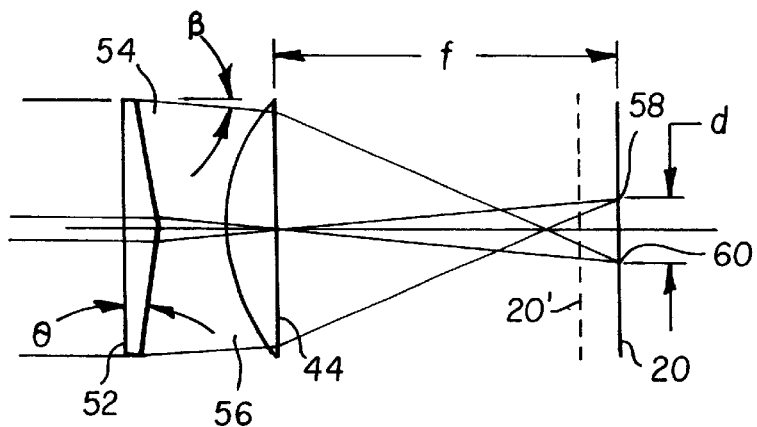
FIG. 6 is a diagram showing the pattern generated by a single pyramid.

To emulate the pattern generated by a four-spot birefringent blur filter, FIG. 6 shows a two-dimensional representation of a configuration including a plastic pyramid 52 placed in front of the camera lens 44. In two dimensions, two bundles of rays 54, 56 will be produced from each incident bundle of rays 48. The two bundles 54, 56 will be inclined at an angle of 2*β. Two points 58, 60 will be formed from the two bundles, the separation d between the two points will be f*2*β=f*θ, as follows $$(d/2) = f^* \beta$$

$$d = 2^* f^* \beta$$

$$\beta = \theta/2$$

$$d = f^* \theta$$

The optimum separation d between image points produced by blur filters has been found to be equal to the pixel pitch p for the sensor (not the pixel pitch for each color plane). The optimum angle for the pyramid based on this criteria is:

$$q = d/f$$

so $$q = p/f$$

For a 6.5 mm lens and 7.4 micron pixel pitch the prism angle will be very small, only 0.0011 radian or 0.065 degree. (Other criteria can be used resulting in different optimum pitch values.) In three dimensions, which is not shown directly in FIG. 6, the incident bundle of ray 48 will be split into four bundles of rays and four image points will be formed on the (three-dimensional) image plane 20.

One problem with the pyramid filter 52 is that the 2-spot pattern, or 4-spot pattern when viewed in 3 dimensions, is not at best focus. Notice in FIG. 6, that if the image plane 20 is moved forward to a position 20', the resulting image spot will be smaller than the original 2-spot pattern. The drawing is exaggerated so that the spot separation can be seen. In real systems, consequently, exaggerated so that the spot separation can be seen. In real systems, consequently, the effect of the filter can be almost entirely mitigated by re-focusing the system.

This means that the user's attempt, or an autofocus camera's attempt, to refocus will remove, or at least reduce, the blur from the image and aliasing problems will become visible.

Another way to look at focus is to consider the effect of focus on the wavefront. Focusing changes the wavefront produced by the lens and the filter by adding or subtracting a spherical error. The pyramid adds a weak pyramidal shape to the wave front that can be approximated by a sphere. Focusing removes the spherical contribution of the filter from the wave front, which accounts for almost all of the wave front error.

Figure 7:
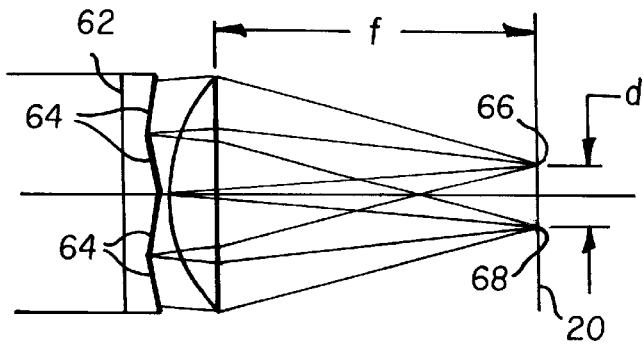
FIG. 7 is a diagram showing the effect of a triangular array filter with four facets.

A blur filter 62 with four facets 64 in the aperture is shown in FIG. 7. The locations of the image points 66, 68 on the image plane 20 do not change because the angles have not changed, but each quarter aperture has a wave front entering at opposite angles. This wavefront shape cannot be approximated by a sphere. Also, notice that there is no position further forward that has a smaller spot size. The wave front thus cannot be corrected by focusing when additional pyramidal facets are added to the blur filter. To prevent correction by focusing, at least four features, in a 2 by 2 array or other configuration, should be included in the bundle of rays that leads to any signal point in the field of the imaging system. It is important to note that the same effect can be obtained from four pyramidal features or from four axicon features.

The prism angle should be chosen to produce a spot separation that will reduce the image modulation to zero at the Nyquist frequency for the sensor. The point spread function for the lens will thus be larger because the pyramid (or axicon) array divides the aperture into 16 or more sub-apertures. This increases the diameter of the point spread function by a factor of 4 because the f-number is four times larger. If the required separation is large enough the point spread functions will not overlap and the design is complete. If the spots overlap, then the coherence has to be considered. This is most easily done with a ray tracing program that can handle the segmented aperture. The result of the overlapping point spread functions is a large number of delta functions in a square array. Most programs will report the modulation transfer function (MTF) of this system. Usually the delta functions are closely spaced so the pixels in the array cannot resolve them. The MTF of the square is a sinc function with the first zero at 1/(width). The angle and the pitch of the array can be adjusted until the desired MTF is reached. The zero is quite solid and independent of the field. This type of filter can be placed in front of the lens or behind the lens if the pitch of the filter is chosen to be small enough for the bundle of rays directed toward any point in the field to pass through at least one full pyramid (or axicon) and preferably through two pyramids (or two axicons). The blur may be somewhat field dependent as ray bundles precess across the array of pyramids (or axicons).

Figure 8:
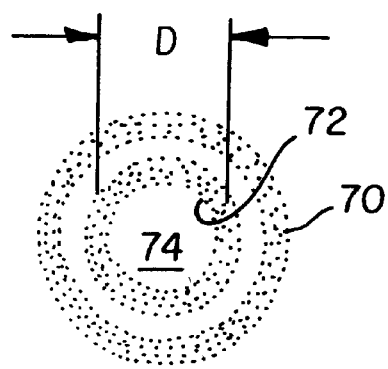
FIG. 8 is an example of the point spread function for a diffraction limited system.

Diffraction increases the size of the system point spread function independent of the angle of the incident rays when the aperture is divided into subapertures. The point spread function for a diffraction limited system with a circular aperture is an airy disk. An example showing the first two dark rings 70, 72 is shown in FIG. 8. The ring structure increases in diameter to infinite radius but the brightness diminishes as the radius increases. Eighty-four percent of the energy is in the central spot 74 and 91% is in the central spot 74 and the first bright ring 72, the second bright ring 70 contains only 3 percent of the energy and the third bright ring (not shown) only contains 1.5% of the energy. The diameter D of the first dark ring is $$D=2.44*\lambda*f/\#$$

(where f/# is the lens aperture) and D is about equal to the f/# in microns for green light ($\lambda$=0.55 micron).

Figure 9:
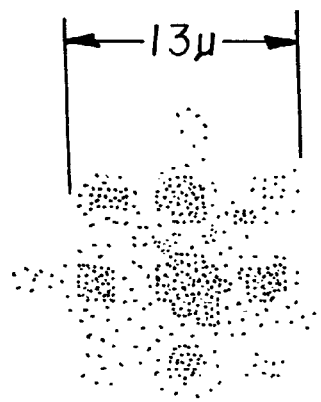
FIG. 9 is an example of a multiple spot pattern generated by a pyramid.

The point spread function due to the square apertures formed by a pyramid (or axicon) will have square symmetry. When the square aperture f/# is defined as (focal length)/(width of square aperture) the point spread function will be about 20% smaller across the flat sides based on the f/# of the square aperture. The f/# for each sub-aperture will be 4 times as large as the f/# of the whole aperture, so the point spread function due to each sub-aperture will be about 4 times as large as the unobstructed aperture. If the facet angles are large enough to separate the enlarged point spread functions the pattern will be 4 spots. If the patterns overlap they will interfere with each other and a multiple spot pattern will result. This pattern is most easily analyzed using a ray tracing program that can model the pupil function and then take the Fourier transform to get the point spread function. An example of the multiple spot pattern is shown in FIG. 9. This pattern was predicted by the ray trace model, it is abut 13 ; microns across. The point spread function without the blur filter is about 3 microns across. The filter used for these images had 0.75 mm wide facets with a 0.6 m peak to valley profile. The filter was placed at the lens aperture stop. path but the blur may be field dependent and focal length dependent in some locations. The filter cosmetic quality becomes more critical as the filter gets closer to the image plane. A typical retrofocus lens comprising optical sections 14 and 16 is shown in FIG. 1. The blur filter 10 can be placed in front of a first element 14', at the stop 12, behind a last element 16', or otherwise integrated into the lens design. If the blur filter is not at the stop, the imaging system should provide compensation for the location of the blur filter. For example, if the blur filter is behind the lens the pitch of the features 30 closer to the image plane 20 will be smaller because the cone leading to off axis points is smaller and the angle of the facets is larger to compensate for the reduced distance between the image plane 20 and the filter 10.

Embodiments of the present invention provide optical blur that is effective at all wavelengths and focal positions and is simple to manufacture. In the preferred embodiment, a regular array of pyramids are diamond machined in an electroless nickel surface. This is a straightforward operation for conventional three-axis diamond turning equipment. The electroless nickel surface can be used as a mold for plastic injection molding.

As mentioned before, the pyramid is not the only shape that can be used in an array to blur an image. An array of axicons with hexagonal bases could also be used as well as any other array of shapes that take advantage of features of the array configuration.

If the system stop in the stop region 12 is adjustable, there may be an aperture setting (f#) the limits the modulation transfer function (MTF) of the system without a blur filter. This occurs when the desired cutoff frequency($\epsilon$) satisfies the following relationship:

$$\epsilon=1/(f\#*\lambda)$$

where $\lambda$ is the primary or center wavelength for which the system is designed. Systems with $4\mu$ to $10\mu$ pixels satisfy this relationship around an aperture setting of f/22. The four feature filter described herein increases the size of the system point spread function by a factor of 4 so the f/# that produces the desired cutoff is decreased by two stops, or equivalently the aperture that produces the desired cutoff is increased in diameter by a factor of 2. The filter should be designed to produce the desired cutoff at this aperture. As the lens is stopped down from this point the blur filter will have less effect and the cutoff due to the system stop will point the blur filter will have less effect and the cutoff due to the system stop will have less effect and the cutoff due to the system stop will have more effect until the system cutoff frequency is dominated by the stop size.

The invention has been described with reference to a preferred embodiment. However, it will be appreciated that variations and modifications can be effected by a person of ordinary skill in the art without departing from the scope of the invention.

PARTS LIST

10 optical blur filter
12 stop region
14 first optical section
16 second optical section
18 incoming rays
18a ray bundle
18b ray bundle
20 image plane
22 image point
24 image point
26 CCD sensor
28 photosensitive pixels
30 features
32 pyramidal feature
34 substrate
36 axicon feature
40 facet
42 incident ray
44 lens
46 optical axis
48 rays
50 central ray
52 pyramid
54 ray bundle
56 ray bundle
58 points
60 points
62 triangular array filter
64 facet
66 points
68 points
70 dark ring
72 dark ring
74 central spot

What is claimed is:

1. Imaging apparatus for focusing image light upon an array of photosites and for limiting the maximum spatial frequency of the image light that falls upon the array of photosites, said imaging apparatus comprising:

an image sensor having a two-dimensional array of photosites;

an optical section through which the image light passes;

an optical filter including an array of four shaped features placed in mutually spaced relation in the optical section such that all incoming rays leading to an image point on the image sensor pass through the four features in order to blur the image light and limit the spatial frequencies to values below the Nyquist frequency of the sensor; and wherein the optical section includes a stop region and the optical filter, though not placed at the stop or at an image of the stop, is placed at a position with some field dependence and correction is provided therefor with the pitch of the image sensor chosen so that the bundle of rays that lead to an image point on the sensor passes through at least one full period of the four shaped features in the array.

2. An imaging apparatus as claimed in claim 1 wherein the optical filter includes an array of four pyramids placed in mutually spaced relation.

3. An imaging apparatus as claimed in claim 1 wherein the optical filter includes an array of four axicons placed in mutually spaced relation.

4. Imaging apparatus for focusing image light upon an array of photosites and for limiting the maximum spatial frequency of the image light that falls upon the array of photosites, said imaging apparatus comprising:

an image sensor having a two-dimensional array of photosites;

an optical section through which the image light passes;

an optical filter consisting of an array of four shaped features placed in mutually spaced relation in the optical section in order to blur the image light and limit the spatial frequencies to values below the Nyquist frequency of the sensor; and wherein the optical section includes a stop region and the optical filter, though not placed at the stop or at an image of the stop, is placed at a position with some field dependence and correction is provided therefor with the pitch of the image sensor chosen so that the bundle of rays that lead to an image point on the sensor passes through at least one full period of the four shaped features in the array.

5. An imaging apparatus as claimed in claim 4, wherein the optical filter includes an array of four pyramids placed in mutually spaced relation.

6. An imaging apparatus as claimed in claim 4, wherein the optical filter includes an array of four axicons placed in mutually spaced relation.

7. Imaging apparatus for focusing image light upon an array of photosites and for limiting the maximum spatial frequency of the image light that falls upon the array of photosites, said imaging apparatus comprising:

an image sensor having a two-dimensional array of photosites;

an optical section having a stop through which the image light passes;

an optical filter consisting of an array of four shaped features placed in mutually spaced relation on a transparent substrate in the stop of the optical section such that all incoming rays leading to an image point on the image sensor pass through the four features in order to blur the image light and limit the spatial frequencies to values below the Nyquist frequency of the sensor; and wherein the optical filter, though not placed at the stop or at an image of the stop, is placed at a position with some field dependence and correction is provided therefor with the pitch of the image sensor chosen so that the bundle of rays that lead to an image point on the sensor passes through at least one full period of the four shaped features in the array.

8. An imaging apparatus as claimed in claim 7, wherein the optical filter includes an array of four pyramids placed in mutually spaced relation on the transparent substrate.

9. An imaging apparatus as claimed in claim 7, wherein the optical filter includes an array of four axicons placed in mutually spaced relation on the transparent substrate.

* * * * *